United States Patent [19]

Bergmans et al.

[11] Patent Number: 5,291,523

[45] Date of Patent: Mar. 1, 1994

[54] VITERBI RECEIVER WITH IMPROVED TIMING MEANS

[75] Inventors: Johannes W. M. Bergmans; Ho W. Wong, both of Eindhoven, Netherlands

[73] Assignee: U.S. Philips Corporation, New York, N.Y.

[21] Appl. No.: 869,409

[22] Filed: Apr. 16, 1992

[30] Foreign Application Priority Data

Apr. 24, 1991 [EP] European Pat. Off. ........ 91200977.6

[51] Int. Cl.$^5$ .................... H03H 7/30; H03H 7/40; H03K 5/159; H03D 1/06
[52] U.S. Cl. ............................... 375/14; 375/12; 375/101
[58] Field of Search ............ 375/12, 14, 99, 101, 375/103, 108, 118, 111, 119; 371/43

[56] References Cited

U.S. PATENT DOCUMENTS

| | | | |
|---|---|---|---|
| 4,494,242 | 1/1985 | Ehrenbard et al. | 375/118 |
| 4,847,871 | 7/1989 | Matsushita et al. | 375/101 |
| 4,896,334 | 1/1990 | Sayer | 375/97 |
| 4,959,845 | 9/1990 | Tol et al. | 375/108 |
| 5,020,078 | 5/1991 | Crespo | 375/14 |
| 5,131,011 | 7/1992 | Bergmans et al. | 375/101 |

OTHER PUBLICATIONS

Armstrong, "Symbol Synchronization Using Band-Rate Sampling and Data-Sequence-Dependent Signal Processing", Jan. 1991, IEEE Transactions on Communications, vol. 39, No. 1, pp. 127–132.

C. N. Georghiades et al., "Sequence Estimation and Synchronization from Nonsynchronized Samples," IEEE Transactions on Information Theory, vol. 37, No. 6, Nov. 1991, pp. 1649–1657.

C. A. Ehrenbard et al., "Band–Rate Line–Interface for Two–Wire High–Speed Digital Subscriber Loops", IEEE Global Telecommunications Conference, Globecom '82, vol. 2, pp. 931–934.

G. Ungerboeck, "Decision Directed Method for Timing Recovery in PAM Data Signal Receivers," IBM Technical Disclosure Bulletin, vol. 18, No. 3, Aug. 1975 pp. 769–771.

Primary Examiner—Curtis Kuntz
Assistant Examiner—Duane Kobayashi
Attorney, Agent, or Firm—Edward W. Goodman

[57] ABSTRACT

Data receiver in which a received signal is sampled and converted to a digital signal by an analog-to-digital converter (1), the signal samples being detected by a Viterbi detector (3). In order to have the sampling effected at the correct instants, these sampling instants are derived from the received symbol values and an error signal which is a metric for a difference between an expected and a recent signal sample. This is effected by a multiplier 4, a low-pass filter 5 and a control signal for a controllable clock oscillator (6). For utilizing the energy in a precursor of the received signal, an error signal $e(k-1)$ is used which is obtained at a later instant than the instant at which a provisional decision about the relevant data symbol $â(k-2)$ is made.

6 Claims, 3 Drawing Sheets

VITERBI RECEIVER WITH IMPROVED TIMING MEANS

BACKGROUND OF THE INVENTION

1. Field Of The Invention

The invention relates to a data receiver comprising deriving means for deriving a detection signal from an input signal, an output of the deriving means being coupled to an input of detection means which determine a most probable sequence of data symbols on the basis of the detection signal, the symbols occurring in the detection signal with a symbol interval T, by recursively updating candidate sequences (survivors) with associated path metrics derived from branch metrics, the branch metrics being an even function of a difference value $e_k$, present at a sampling instant kT of the detection signal and of the detection signal expected for the relevant candidate survivor, while k is an integer.

2. Description Of The Related Art

A receiver of this type is known from the journal article "On the use of decision feedback for simplifying the Viterbi detector" by J. W. M. Bergmans et al., in Philips Journal of Research, Vol. 42, No. 4, 1987.

Receivers of this type may be used, for example, for data signal transmission through the public telephone network or for reconstructing data signals from a magnetic tape or disc.

When data symbols are transmitted by means of a transmission medium or stored on a recording medium, respectively, the data symbols to be transmitted or recorded are converted to analog pulses which are applied to the transmission medium and recording medium, respectively.

Generally, the analog pulses are provided not to overlap in time. If the medium has a limited bandwidth, the pulses will start to overlap which will often lead to the fact that a detection signal received at a specific moment does not only depend on a single data symbol but also on data symbols adjacent in time. This effect is called intersymbol interference.

In addition to being caused by a limited bandwidth of the medium, intersymbol interference may also be caused by the use of a band limiting filter at a transmitter end used for giving the frequency spectrum of the transmitted or recorded analog pulses a desired shape. The presence of intersymbol interference will often lead to an enhanced bit error rate.

A possibility of reducing the enhancement of the bit error rate caused by intersymbol interference is the use of an intersymbol interference equalizer which is adaptive or not. This equalizer may have the form of a filter with a transfer function that is inverse to the transfer function of the medium. By cascading this filter with the medium, a more or less flat transfer characteristic is obtained, so that the intersymbol interference disappears. However, a problem may be that the filter considerably amplifies noise already available.

Another possibility of reducing intersymbol interference is the use of a decision feedback intersymbol interference compensator. In this compensator a compensation signal is subtracted from the received detection signal on the basis of decisions taken about data symbols that have already been received. This compensation signal is an estimate of the postcursive intersymbol interference belonging to the received symbol. This intersymbol interference occurs subsequent to the cursor (main pulse) belonging to the data symbol. Since the compensation signal is determined by a decision about the value of a received data symbol, which decision may in fact be erroneous but does not further cause any noise, there is no noise gain now.

A drawback of the use of a decision feedback intersymbol interference compensator is that precursive intersymbol interference, preceding the cursor, cannot be compensated because first the received data symbol is to be known before the compensation signal belonging to the data symbol can be generated.

An optimum receiver capable of eliminating the effect of both precursive and postcursive intersymbol interference determines all possible sequences of transmitted data symbols and the associated detection signals which would have been received if the sequence of data symbols were transmitted by the channel considered noise-free. By comparing all the detection signals thus obtained to the recent detection signal, the most probable sequence of transmitted data symbols can be determined. Such a receiver, however, requires an impracticably large computing and storage capacity.

In the receiver known from the aforementioned journal article, the most probable sequence of transmitted data symbols is determined by the detection means by recursively updating a limited number $M = L^N$ of candidate survivors in which L is the number of levels of the transmission or recording signal used and N is the impulse response length of the cascaded send filter, of the medium and of the receive filter expressed in numbers of samples. This number is necessary because the channel may have M states and the receiver is to be capable of distinguishing between these states.

Once the M candidate survivors with associated path metrics have been determined, each candidate survivor is extended upon the arrival of a next data symbol to a plurality of candidate survivors of which only the data symbols extended last differ. The path metric associated to each new candidate survivor is determined on the basis of the path metric of the candidate survivor from which the new candidate survivor is derived and the branch metric associated to this new candidate survivor.

In order to achieve that the necessary computing and storage capacity still continues to be independent of the length of the transmitted data sequence, the number of candidate survivors is reduced by removing the oldest data symbol from each candidate survivor. Such detection means are usually referred to as a Viterbi detector.

For optimum detection it is necessary that the difference values be calculated at the correct sampling instants. Since these correct sampling instants are not known to the receiver, these sampling instants are to be derived from the detection signal. Nothing about deriving the sampling instants from the detection signal can be gathered from the aforementioned journal article.

SUMMARY OF THE INVENTION

It is an object of the invention to provide a receiver as stated in the opening paragraph in which the sampling instants at which the difference signals are calculated are derived from the detection signal.

For this purpose, the receiver is characterized, in that the receiver comprises timing means for delaying the sampling instants if the sign of the difference value $e_{k-n}$ at a sampling instant $(k-n)T$, where n is a fixed positive number and where the difference value is associated to the most probable candidate survivor at the sampling instant kT, and the sign of an estimate $f_{(k-n-m)T}(â_{k-n-m})$ of the contribution of a symbol $â_{k-n-m}$ (m=1,2,3,. . .) estimated at a sampling instant (k−n−m)T to the detection signal at an instant (k−n−m)T are equal, the symbol $â_{k-n-m}$ being taken from the candidate survivor which is the most probable at the sampling instant kT; and for advancing the sampling instants if the two signs are different.

With the measures taken, it is assumed that the impulse response of the medium comprises at least a precursor and a cursor (main pulse) of opposite signs and, of necessity, a zero crossing inbetween. The timing means according to the invention provide that the sampling instants coincide with these zero crossings. The function $f_t(a_q)$ is an estimate of the contribution by the medium response at an instant t due to a transmitted data symbol $a_q$ to the total input signal of the detection means. The contribution $f_{iT}(a_{iT})$ is an estimate of the precursor occurring at an instant iT and belonging to a data symbol $â_i$. If for a data symbol $â_{k-n-m}$ the contribution $f_{(k-n-m)T}(â_{k-n-m})$ has the same sign as the difference value $e_{k-n}$, the difference value will have been determined during the precursor and the sampling instant will be early and will be delayed. If $f_{(k-n-m)}(â_{k-n-m})$ has a different sign from the difference value $e_{k-n}$, the difference value will have been determined during the rising edge of the cursor (main pulse) and the sampling instants will be late and will be advanced. The result will be that the contribution to the detection signal at an instant (k−n)T due to a data symbol at an instant (k−n−m)T is made equal to zero.

It should be observed that U.S. Pat. No. 4,494,242 has disclosed a method of deriving sampling instants from a received signal.

However, in that Patent, there is assumed that the signal belonging to a data symbol $â_k$ commences only after the zero crossing. This means that the precursor is not considered part of a signal belonging to a specific transmitted data symbol $a_k$. As a result, the precursive intersymbol interference caused by the precursor can no longer be compensated which will generally lead to a higher bit error rate.

In the timing means according to the invention, however, a (provisional) decision already made about a received data symbol is used immediately after the precursor belonging to that data symbol has been received. This means that the precursor is considered part of the signal belonging to a specific transmitted data symbol $a_k$, so that now it is indeed possible to compensate the intersymbol interference caused by the precursor.

A further embodiment of the receiver according to the invention is characterized, in that m is equal to 1, in that in the detection means, the input of the detection means is coupled to a first Viterbi detector via first correction means, in that in the detection means, the input of the detection means is coupled to a second Viterbi detector via second correction means, the first correction means subtracting a first correction signal from the input signal of the first correction means and the second correction means subtracting a second correction signal from the input signal of the second correction means, the first and second correction signals being equal to:

$$\sum_{i=1}^{N'} g_t(â_{k-2i-1}) \quad (1)$$

while for the first correction signal, $â_{k-2i-1}$ is taken from the candidate survivor in the second Viterbi detector most probable at an even sampling instant kT, and for the second correction signal, $â_{k-2i-1}$ is taken from the candidate survivor in the second Viterbi detector most probable at an odd sampling instant kT, where $g_t(â_{k-2i-1})$, at instants (k+p)T with p being an integer greater than or equal to 0, equals $f_t(â_{k-2i+1})$; where N is the length, in numbers of symbol intervals, of the estimate response $f_t$, where N' equals (N−3)/2 if N is odd, and where N' equals (N−2)/2 if N is even.

By splitting the detection signal into an even and an odd detection signal, two detection signals are obtained at half the symbol rate. These two detection signals may be detected by means of their own Viterbi detectors so that parallel processing is possible. This doubles the maximum permissible symbol rate.

These measures cause the detection signal to become an "even" detection signal which mainly depends on the data symbols at even instants kT, and an "odd" detection signal which mainly depends on the data symbols at odd instants kT. When the detection signal is split up into an even and an odd detection signal, it appears that the even detection signal also depends on the odd data symbols and the odd detection signal also depends on the even data symbols. This dependence will have a disturbing effect on a correct symbol detection.

By subtracting suitable correction signals from both detection signals, the effect of even data symbols on the odd detection signal and the effect of odd data symbols on the even detection signal is eliminated.

A further embodiment of the invention is characterized, in that N' is equal to 1, in that the number of possible symbol values is equal to 2, and in that a path metric difference is updated that is a measure for the difference between a first sum of even function values of the consecutive branch metrics associated to a first candidate survivor and a second sum of even function values of the consecutive branch metrics associated to a second candidate survivor.

Since N' is equal to 1 and the number of possible symbol values is equal to 2, there are no more than two candidate survivors. This makes it possible to update a path metric difference between the path metrics in lieu of the path metrics themselves.

An advantage of this is that the path metric difference is largely bounded, whereas the path metrics themselves may be large in the case of long messages.

A preferred embodiment of the receiver according to the invention is characterized in that the receiver comprises adapting means for adapting $f_t$ to the recent response of the medium to a data symbol on the basis of the branch metrics e and the estimated data symbols â, wherein the adapting means adapts $f_t$ at an instant kT on the basis of the branch metric $e_{k-n}$ present at an instant (k−n)T, which branch metric is associated to the candidate survivor most probable at the instant kT.

By utilizing an error signal $e_{k-n}$ in lieu of $e_k$ for adapting $f_t$, there is achieved that for determining $e_{k-n}$, a recent decision about an older symbol value may be used, so that the decisions about the symbol values used for determining f will be more reliable. This enhances the accuracy of the error signal, so that fewer erroneous adaptations of $f_t$ will be made.

BRIEF DESCRIPTION OF THE DRAWINGS

The invention will be further explained with reference to the drawing Figures, in which.

DESCRIPTION OF THE PREFERRED EMBODIMENT

As noted above, by splitting the detection signal into an even and an odd detection signal, two detection signals are obtained at half the symbol rate. These two detection signals may be detected by means of their own Viterbi detectors so that parallel processing is possible. This doubles the maximum permissible symbol rate.

These measures cause the detection signal to become an "even" detection signal which mainly depends on the data symbols at even instants kT, and an "odd" detection signal which mainly depends on the data symbols at odd instants kT. When the detection signal is split up into an even and an odd detection signal, it appears that the even detection signal also depends on the odd data symbols and the odd detection signal also depends on the even data symbols. This dependence will have a disturbing effect on a correct symbol detection.

By subtracting suitable correction signals from both detection signals, the effect of even data symbols on the odd detection signal and the effect of odd data symbols on the even detection signal is eliminated.

Hereinafter there will be explained how the two detection signals depend on the transmitted symbol values and which values the correction signals are to have.

It is assumed that the function $f_t(\hat{a}_k)$ determined by the detector is a proper estimate of the contribution of a transmitted data symbol $a_k$ to the detection signal at an instant t. Furthermore, it is assumed that a sequence of data symbols $a_k$ is applied to the input of the medium. The estimated input signal s(t) of the detection means may then be written as:

$$s(t) = \sum_{i=0}^{N-1} f_t[\hat{a}(k-i)] + n(t) \quad (2)$$

Herein N is the length of the impulse response estimate of the medium in numbers of samples while n(k) is the additive noise present in each detection signal.

By splitting up s(t) into an even part denoting the data symbol response at even sampling instants and an odd part denoting the data symbol response at odd sampling instants, (2) may be written as:

$$s(t) = \sum_{i=0}^{N'} \{f_t[\hat{a}(k-2i)] + f_t[\hat{a}(k-2i-1)]\} + \quad (3)$$

$$n(t) = \sum_{i=0}^{N'} f_t[\hat{a}(k-2i)] + \sum_{i=0}^{N'} f_t[\hat{a}(k-2i-1)] + n(t)$$

In this equation N' equals (N−3)/2 if N is odd and N' equals (N−2)/2 if N is even. In (3) the first summation (in the second line of (3)) denotes a cross-term which describes, for the even detection signal, the effect of the odd data symbols on this even detection signal, while the second summation, for the odd detection signal, denotes a cross-term which describes the effect of the even data symbols on this odd detection signal.

By deriving estimated cross-terms from the most probable candidate survivor of data symbols for each branch and by subtracting correction terms equalling the cross-terms from the relevant detection signals in the other branch, the effect of the even data symbols on the odd detection samples as well as the effect of the odd data symbols on the even detection signal may be eliminated. The correction signals c(k) for either branch are equal to:

$$c(t) = \sum_{i=0}^{N'} f_t[\hat{a}(k-2i-1)] \quad (4)$$

If $f_t(a_k)$ has a precursor situated at t = kT and a main pulse (cursor) at t=(k+2)T, the received data symbols up to an including $\hat{a}_{k-1}$ are to be known so as to be capable of calculating the correction terms at a specific sampling instant kT.

Since, subsequently, at the instant kT, no more than the precursor of the data symbol $\hat{a}_{k-1}$ has been received, the precursor containing no more than a fraction of the energy available for a data symbol, no reliable estimate of this data symbol $\hat{a}_{k-1}$ is possible yet at the instant kT. However, because the influence of $\hat{a}_{k-1}$ on the correction term is equal to $f_{kT}(\hat{a}_{k-1})$ and also the timing means provide that the value of $f_{kT}(\hat{a}_{k-1})$ is equal to 0, the contribution of $\hat{a}_{k-1}$ to the correction term at the instant kT is equal to 0, so that a reliable decision about the data symbol $\hat{a}_{k-1}$ is not necessary at the instant kT. The most recent symbol now necessary for calculating the correction term is then $\hat{a}_{k-3}$. The attendant contribution to the correction term at instant kT is now $f_{kT}(\hat{a}_{k-3})$. By utilizing the function $g_t$ in combination with a more recent decision about the symbol $a_{k-3}$, a correction signal is generated that has the same effect as the utilization of the function f in combination with a less recent decision about the symbol $a_{k-3}$. The advantage of this is that the more recent decision will be more reliable, so that the correction signal will be correct more often. At the instant Kt, both the precursor and the cursor belonging to the symbol $\hat{a}_{k-3}$ have been received, so that a reliable decision about the symbol $\hat{a}_{k-3}$ is indeed possible at the instant kT.

The above explanation shows that the splitting up of the detector into two parallel branches is only feasible in combination with the timing means according to the invention.

The impulse response as shown in FIG. 1a causes precursive intersymbol interference to occur at 3 sampling instants and at 2 sampling instants prior to the main pulse. A zero crossing occurs at one sampling instant prior to the main pulse. A suitable value for m is in this case equal to 2, because the zero crossing occurs at two sampling instants subsequent to the sampling instant at which a first provisional decision about a symbol received at this instant is possible. A suitable value for n is equal to 1, because a reliable decision about the received symbol value is possible after (n+m)=3 sampling instants once a first provisional decision about the received symbol value has been made.

The impulse response as shown in FIG. 1b causes precursive intersymbol interference to occur at the sampling instant situated at 2 sampling instants prior to the main pulse. A zero crossing takes place at 1 sampling instant prior to the main pulse. A suitable metric for the timing error has now m=1 and n=1.

Figure 2:
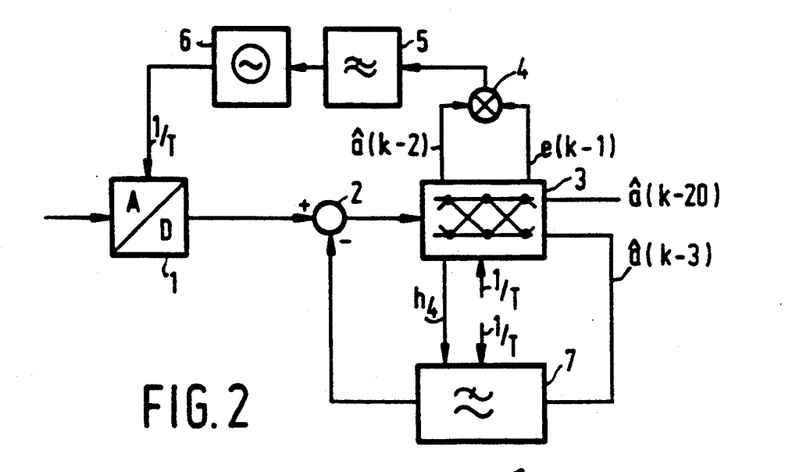
FIG. 2 shows a block diagram of a data receiver comprising timing means according to the invention, belonging to a medium having an impulse response as shown in FIG. 1b.

In FIG. 2 an input signal is applied to an analog-to-digital converter 1. The output of the analog-to-digital converter 1 is connected to a positive input of a subtracter 2. The output of the subtracter 2 is connected to an input of detection means i.e. a Viterbi detector 3. A first output of the Viterbi detector 3 carrying the output signal â(k−20) forms the point at which the received data symbols are available. A second output of the Viterbi detector 3 carrying output signal â(k−3) is connected to the input of a feedback filter 7. The output of the feedback filter 7 is connected to a negative input of the subtracter 2. A third output of the Viterbi detector 3 carrying an output signal â(k−2) is connected to a first input of a multiplier 4. A fourth output of the Viterbi detector 3 carrying output signal e(k−1) is connected to a second input of the multiplier 4. The output of the multiplier 4 is connected to an input of a low-pass filter 5. The output of the low-pass filter 5 is connected to a frequency control input of a frequency-controlled clock oscillator 6 having a nominal frequency 1/T. The output of the clock oscillator 6 is connected to clock inputs of the analog-to-digital converter 1, the Viterbi detector 3 and the feedback filter 7. An output of the Viterbi detector 3 which carries output signal h4 is connected to the feedback filter 7.

In the data receiver as shown in FIG. 2 the input signal is sampled at sampling instants kT by the analog-to-digital converter 1 and converted to a digital signal. This is done to further process the detection signal by way of signal samples with the aid of digital means.

However, it is possible to perform the decision feedback equalization and determine the detection signal expected to accompany a candidate survivor with the aid of analog means.

The subtracter 2 subtracts an estimate of the postcursive intersymbol interference from the signal samples, so that the Viterbi detector 3 is supplied with signals having only precursive intersymbol interference, so that the necessary length of the candidate survivors in the Viterbi detector remains bounded. An estimate of the postcursive intersymbol interference is obtained by applying already detected data symbols to a feedback filter 7 which has an impulse response that is a proper estimate of the postcursive part of the impulse response of the medium including any transmit and receive filters, which part is to be eliminated. The use of a feedback filter for reducing the complexity of a Viterbi detector is described in aforementioned journal article.

Because the input signal is converted into signal samples with an interval T, the function $f_t$ may be described as a series of samples, each sample of which depends on different consecutive data symbols in the following way:

$$f_{kT} = h_0 \cdot \hat{a}_k + h_1 \cdot \hat{a}_{k-1} + h_2 \cdot \hat{a}_{k-2} + h_3 \cdot \hat{a}_{k-3}$$

In the following, a pulse shape according to FIG. 1b is assumed. Consequently n and m are both equal to 1, because the zero-crossing occurs one sampling instant before the main pulse, and the precursor occurs one sampling instant before the zero-crossing (i.e. 2 sampling instants before the main pulse). The contribution of symbol $\hat{a}_k$ to the signal $f_{kT}$ then equals to the product of $\hat{a}_k$ and an estimate of the first sample $h_0$ of the impulse response of the medium. From FIG. 1b, it can be seen that the sign of $f_{kT}(\hat{a}_k)$ is opposite to the sign of the associated symbol value, whose sign corresponds to the sign of the main pulse.

The difference signal $e_{k-1}$ represents the difference between the detection signal at instant (k−n)T, here being (k−1)T and an expected value of said detection signal (here equal to 0, see FIG. 1b).

If the sample is taken during the precursor (before the zero crossing), the sign of the sample, and consequently of the difference value $e_{k-1}$, is always different from the sign of the symbol value. By multiplying the difference signal $e_{k-1}$ with the symbol value $\hat{a}_{k-2}$, a timing signal having a negative sign, regardless of the sign of $\hat{a}_{k-2}$, is obtained. The sampling instants are then to be advanced.

If the sample is taken during the cursor (after the zero crossing), the sign of the sample, and consequently of the difference value $e_{k-1}$, is always the same as the sign of the symbol value. By the multiplication of $e_{k-1}$ with $\hat{a}_{k-2}$, a timing signal having positive sign, regardless of the sign of $\hat{a}_{k-2}$, is obtained. The sampling instants are then to be delayed.

For determining the timing error, the data symbol $\hat{a}_{k-2}$ is used because a reliable decision about the value of this data symbol $\hat{a}_{k-2}$ can be made at the sampling instant kT because at the instant kT both the precursor and the cursor belonging to this data symbol $\hat{a}_{k-2}$ have been received.

For determining the mean value of the timing error signal, the output signal of the multiplier 4 is passed through the low-pass filter 5. The sign of the filtered timing error signal is applied to the frequency control input of the clock oscillator so as to adjust the sampling instants in a right direction.

Figure 3:
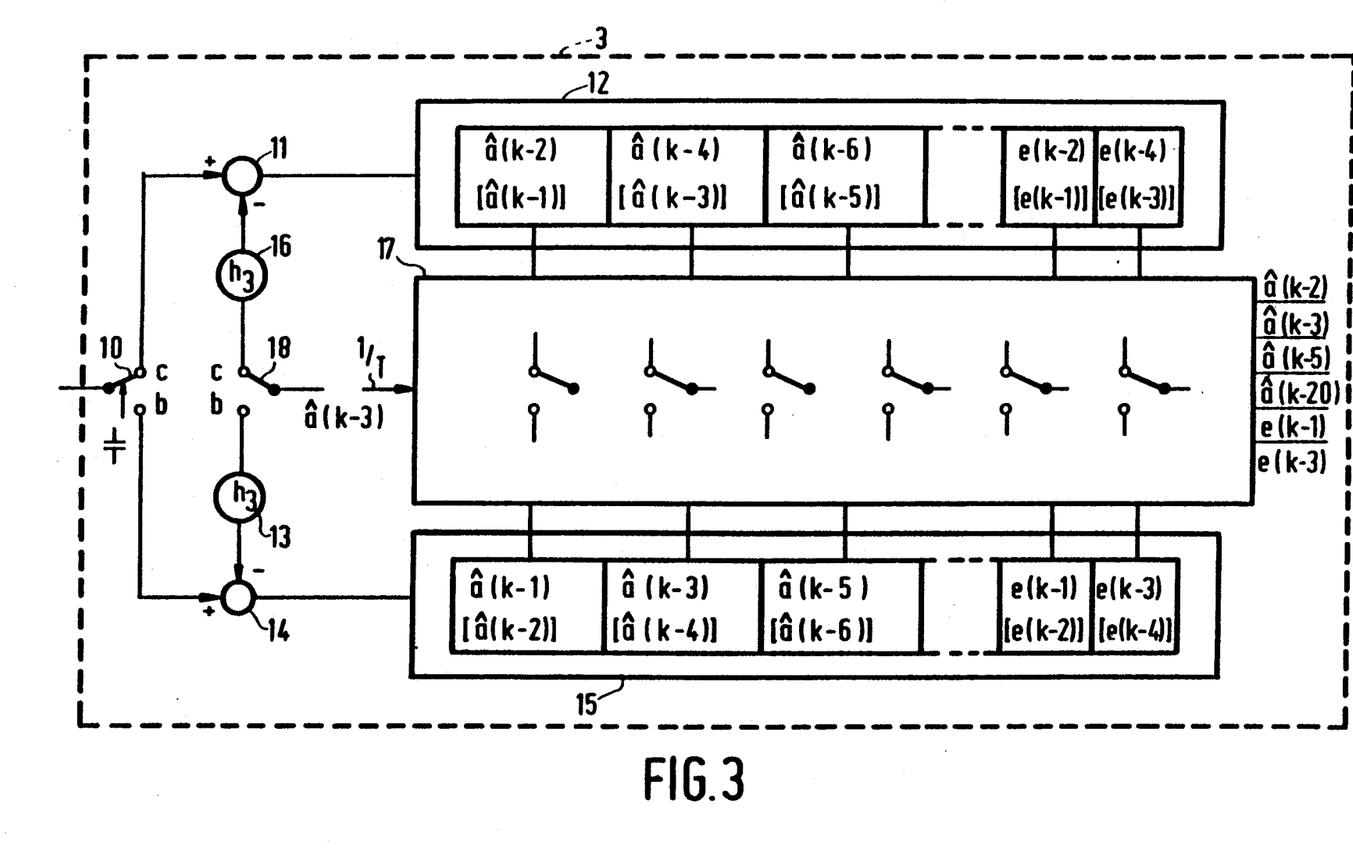
FIG. 3 shows a block diagram of detection means according to the invention, in which a Viterbi detector is subdivided into two Viterbi detectors operating in parallel.

In the detection means as shown in FIG. 3, the detection signal is split up into an even and an odd detection signal by means of a change-over switch 10 which changes over at each sampling instant. The input signal of the detection means is applied to the central contact of the change-over switch 10. The contact c of the change-over switch 10 is connected to a positive input of a subtracter 11. The negative input of the subtracter 11 is connected to the output of a weighing circuit 16. The subtracter 11 and the weighing circuit 16 together form a first correction means according to the inventive idea. The output of the subtracter 11 is connected to the first detector according to the inventive idea, formed in this case by a Viterbi detector 12. The contact b of the change-over switch is connected to a positive input of a subtracter 14. The negative input of the subtracter 14 is connected to the output of a weighing circuit 13. The subtracter 14 and the weighing circuit 13 together form the second correction means. The output of the subtracter 14 is connected to the second detector in this case formed by a Viterbi detector 15.

The decisions about the value of already received data symbols, which decisions are present in the Viterbi detectors 12 and 15 at even sampling instants, are stated in the relevant Viterbi detectors. The symbol values in square brackets are the symbol values present in the relevant Viterbi detector for the odd sampling instants. The outputs of the Viterbi detector 12 carrying the output symbols $â_{k-2}$, $â_{k-4}$, $â_{k-6}$ and the difference signals $e_{k-2}$ and $e_{k-4}$ are fed to as many inputs of a multiplexer 17. The outputs of the Viterbi detector 15 carrying the output symbols $â_{k-1}$, $â_{k-3}$, $â_{k-5}$ and the difference signals $e_{k-1}$ and $e_{k-3}$ are fed to as many inputs of the multiplexer 17. A clock input of the multiplexer 17 is supplied with a clock signal generated by the clock oscillator 6. The multiplexer 17 has outputs carrying the output symbols $â_{k-2}$, $â_{k-3}$, $â_{k-20}$ and the difference signals $e_{k-1}$ and $e_{k-3}$ coming from the two Viterbi detectors. The input of the two weighing circuits 13 (16) is connected to a contact b (c) of a change-over switch 18 whose central contact is connected to the output that carries output signal $â_{k-3}$ of the multiplexer 17.

Because the change-over switch 10 in the detecting means as shown in FIG. 3 changes state every clock period, the even signal samples consecutively become available at the contact c of the change-over switch 10. By generating, according to the inventive idea, a first correction signal with the aid of the correcting means comprising the subtracter 11 and the weighing circuit 16, and subtracting this first correction signal from the even signal samples, an even detection signal for the Viterbi detector 12 is obtained, which is independent of the odd symbol values. The signal thus obtained is detected by the Viterbi detector 12, so that the even symbol values are available at the outputs of the Viterbi detector 12.

The odd signal samples are now consecutively available at the contact b of the change-over switch 10. By generating, in accordance with the inventive idea, a second correction signal with the aid of the correcting means comprising the subtracter 13 and the weighing circuit 14, and subtracting this second correction signal from the odd signal samples, an odd detection signal for the second detection means is obtained, which is independent of the even symbol values. The detection signal thus obtained is detected by the Viterbi detector 15, so that the odd symbol values are available at the output of the Viterbi detector 15.

In the Viterbi detector 12 there is indicated which symbol values and which error signals are available in this Viterbi detector at even sampling instants. They are the symbol values and difference signals, respectively, $â_{k-2}$, $â_{k-4}$, $â_{k-6}$, $e_{k-2}$ and $e_{k-4}$. In the Viterbi detector 15, the signals $â_{k-1}$, $â_{k-3}$, $â_{k-5}$, $e_{k-1}$ and $e_{k-3}$ are available at the same even sampling instant. At the next sampling instant k, which will be odd, the data symbols already available in Viterbi detector 12 are extended by the most recent symbol determined during the previous sampling interval. This changes the rank number of the already available data symbols expressed in square brackets [. . .]. In Viterbi detector 12, the signals $â_{k-1}$, $â_{k-3}$, $â_{k-5}$, $e_{k-3}$ and $e_{k-3}$ are available. The rank number of the data symbols in the Viterbi detector 15 likewise changes, which is also represented in brackets [. . .]. In Viterbi detector 15, the data symbols and difference signals $â_{k-2}$, $â_{k-4}$, $â_{k-6}$, $e_{k-2}$ and $e_{k-4}$, respectively, are available.

The multiplexer 17 is constituted, in essence, by six change-over switches controlled by the clock signal, which switch the output signals of the Viterbi detectors 12 and 15 through to the appropriate output of the multiplexer 17. The weighing circuits 13 and 16 generate, according to the inventive idea, first and second correction signals equal to $g_{kT}(â_{k-3})$, where, for $â_{k-3}$, the most recent decision about $â_{k-3}$ is taken. This correction signal now equals $h_3 \cdot â_{k-3}$, where $h_3$ is the sample at instant 3T of the discrete time impulse response estimate of the medium. $h_3$ is determined in an adaptive manner on the basis of the error signal $e_k$ and the received symbol values as will be explained hereinafter.

Figure 4:
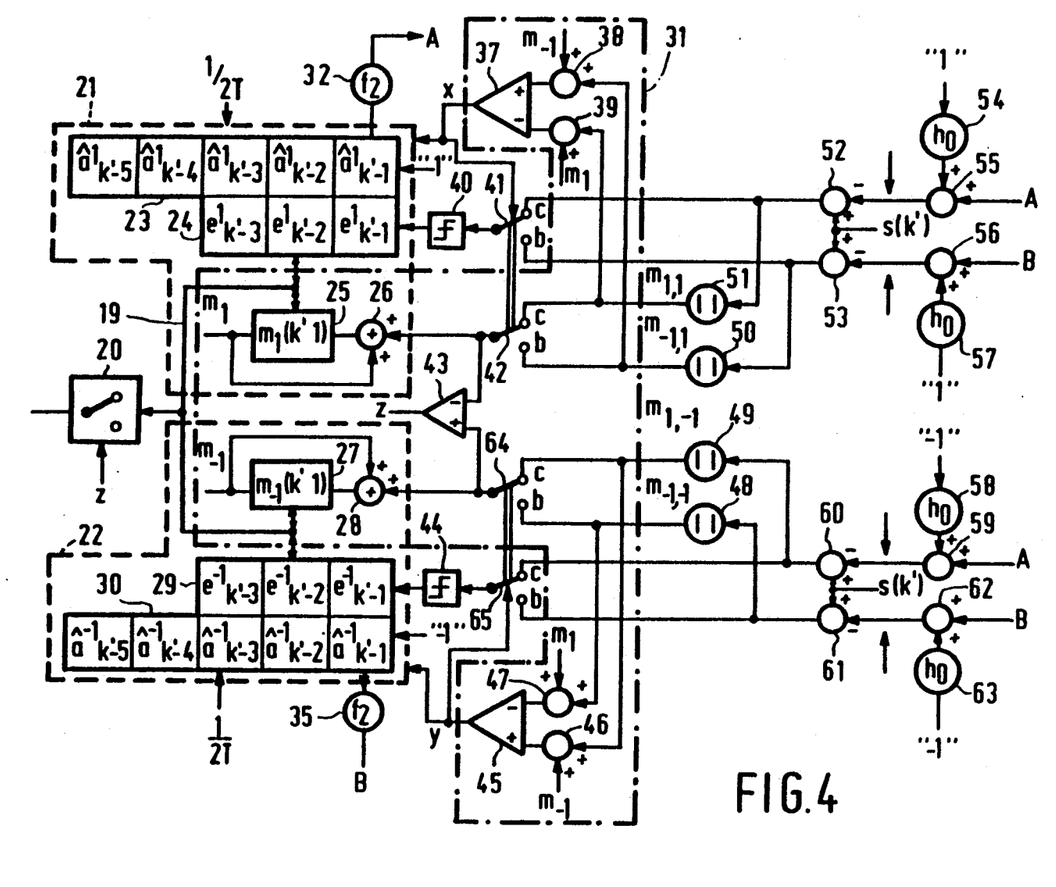
FIG. 4 shows a Viterbi detector to be used in a detector as shown in FIG. 3.

In the Viterbi detector, as shown in FIG. 4, memory unit 21 (22) comprises a first shift register 23 (30) and a second shift register 24 (29). The memory unit 21 (22) additionally includes a register accumulator constituted by an adder 26 (28) and a register 25 (27). The register 25 (27) has an output signal $m_1$ ($m_{-1}$).

The two memory units 21 and 22 are coupled to a bidirectional data bus 19, so that the contents of both the shift registers 23 (30) and 24 (29) and the contents of the register 25 are transferred by the data bus to the other memory unit. This transfer is effected if control signals x and y are applied to the memory unit which is to take over symbol values with associated error signals from the other memory unit. The data bus 19 is also coupled to a multiplexer 20 which is controlled by a control signal z coming from a comparator 43.

The input of the shift register 23 is supplied with a signal having a fixed logic value "1", whereas the shift register 30 is supplied with a signal having a fixed logic value "−1". The output signal $â^1_{k'-1}$ ($â^{-1}_{k'-1}$) of the shift register 23 (30) is applied to a multiplier 32 (35) which multiplies its input signal by the value $h_2$, so that an output signal A (B) is obtained.

The signal A is applied to an adder 55 (59) whereas the signal B is applied to an adder 56 (62). A signal having a logic value "1"(37 −1") is applied to a multiplier 54 (63) which multiplies its input signal by a factor of $h_0$. The output of the multiplier 54 (63) is connected to a second input of the adder 55 (62). A signal having a logic value "1" ("−1") is applied to a multiplier 57 (58) which multiplies its input signal by a factor of $h_0$. The output of the multiplier 57 (58) is connected to a second input of the adder 56 (59). The output of the adder 55 (59) is connected to a negative input of a subtracter 52 (60). The output of the adder 56 (62) is connected to a negative input of a subtracter 53 (61).

The input signal s(k') of the Viterbi detector is applied to the positive inputs of the subtracters 52, 53, 60 and 61. The output of the subtracter 52 (60) is connected to a contact c of the change-over switch 41 (65) and to the input of an absolute value calculator 51 (49). The output of the subtracter 53 (61) is connected to a contact b of the change-over switch 41 (65) and to the input of an absolute value detector 50 (48). The output of the absolute value detector 51 (49) carrying output signal $m_{1,1}$ ($m_{1,-1}$) is connected to the input of an adder 39 (46) and to a contact c of a change-over switch 42 (64). The output of the absolute value detector 50 (48) carrying output signal $m_{-1,1}$ ($m_{-1,-1}$), is connected to a contact b of the change-over switch 42 (64) and to the input of an adder 38 (47). The output of the register 25 carrying output signal $m_1$ is connected to an input of the adder 39 and to an input of the adder 47. The output of the register 27 carrying output signal $m_{-1}$ is connected to an input of the adder 38 and to an input of the adder 46.

The output of the adder 38 is connected to the positive input of a comparator 37, and the output of the adder 39 is connected to the negative input of the comparator 37. The output of the comparator 37 carrying output signal x is connected to a control input of a memory unit 21 and to a control input of the switches 41 and 42. The output of the adder 46 is connected to the positive input of a comparator 45 and the output of the adder 47 is connected to the negative input of the comparator 45. The output of the comparator 45 carrying output signal y is connected to a control input of the memory unit 22 and to a control input of the switches 64 and 65.

The central contact of the switch 41 (65) is connected to the input of a sign calculator 40 (44). The output of the sign calculator 40 (44) is connected to the input of the shift register 24 (29). The central contact of the switch 42 is connected to an input of the adder 26 and to the negative input of a comparator 43. The central contact of the switch 64 is connected to the input of an adder 28 and to the positive input of the comparator 43. The output of the comparator 43, carrying output signal z, is connected to the control input of a multiplexer 20. At the output of the multiplexer 20 the desired output signals of the Viterbi detector are available.

In the Viterbi detector, as shown in FIG. 4, the memory units 21 and 22 are included for storing two candidate survivors and the associated error signals and path metrics. There are not more than two candidate survivors because the major part of the postcursive intersymbol interference is eliminated by means of the feedback filter shown in FIG. 2 and because, according to the inventive idea, two independent streams of signal samples are obtained which only depend on the current symbol value and the preceding symbol value. In memory unit 21, the already received data symbols are present in the shift register, whereas the sign of the difference values associated to the data symbols from the first candidate survivor are available in the shift register 24. The sign of the difference values is stored in the form of a logic value which may be "−1" or "1". The sign of the difference value contains sufficient information for correctly adjusting the sampling instant and for adaptively calculating the estimate of the impulse response of the medium. The register 25 stores the path metric of the candidate survivor stored in the shift register 21. The shift register 30 stores the second candidate survivor. The shift register 29 stores the error signals associated to the second candidate survivor, while register 27 stores the path metric associated to the candidate survivor stored in shift register 29.

If a new signal sample is made available to the Viterbi detector, the two candidate survivors may be extended to 4 new candidate survivors by extending both candidate survivors with a data symbol having a logic value "−1" as well as a data symbol having a logic value "1".

Figure 1:
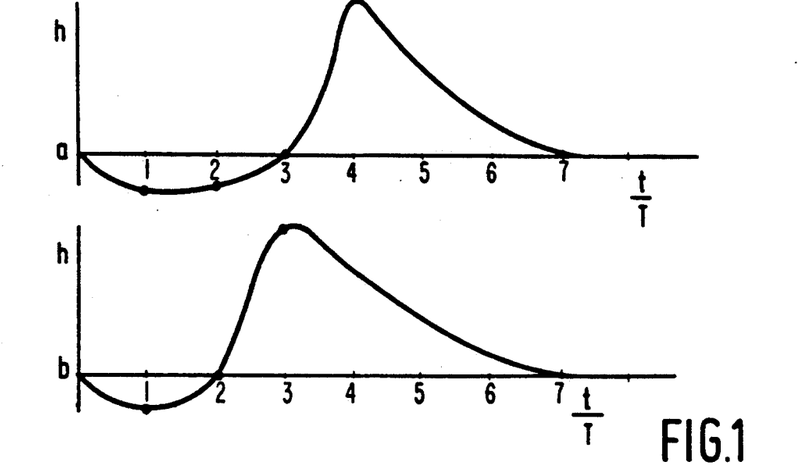
FIGS. 1a and 1b show two possibilities of an impulse response of a transmission or recording medium that causes precursive intersymbol interference.

For all four new candidate survivors, the expected signal sample is determined. For a first new candidate survivor having $a_{k-1}, a_k$ = "1,1" for the last two symbol values, the expected signal sample is determined with the aid of the multipliers 32 and 54 and the adder 55. These circuits produce the sum of the last two symbol values weighted by $h_0$ and $h_2$. $h_0$ and $h_2$ are estimates of the precursor and the cursor respectively, of the impulse response of the medium as represented in FIG. 1-b. The output of the adder 52 presents the estimate of the signal sample which is associated to the candidate survivor ending in "1,1".

With the aid of the multipliers 35 and 57 and adder 56, the expected value of the signal sample which is associated to the candidate survivor ending in "−1,1", is determined, this value being presented at the output of the adder 56. The estimate of the signal sample which is associated to the candidate survivor ending in "1,−1", is determined with the aid of the multipliers 32 and 58 and adder 59, this estimate being presented at the output of the adder 59. With the aid of the multipliers 35 and 63 and adder 62, the expected value of the signal sample which is associated to the candidate survivor ending in "−1,−1", is determined, this value being presented at the output of the adder 62.

Subtraction of the current signal sample from the estimates of the signal samples, with the aid of the subtracters 52, 53, 60 and 61, produces difference signal samples which are associated to the different candidate survivors. The branch metrics, in this case equal to the absolute values of the various difference signals, are determined by the absolute value calculators 48, 49, 50 and 51. For example, the output of the absolute value calculator 51 presents the absolute value of the difference signal which is associated to the candidate survivor ending in "1,1", the output of the absolute value calculator 50 presents the absolute value of the difference signal which is associated to the candidate survivor ending in "−1,1", the output of absolute value calculator 49 presents the absolute value of the difference signal which is associated to the candidate survivor ending in "1,−1", and the output of absolute value calculator 48 presents the absolute value of the difference signal which is associated to the candidate survivor ending in "−1,−1".

With the aid of adder 38 (46), the total path metric $m_1$ ($m_{-1}$) associated to the candidate survivor ending in "−1,1" ("1,−1"), is determined, while the path metric of the candidate survivor ending in "1,1" ("−1,−1") is determined with the aid of the adder 39 (47). $m_1$ and $m_{-1}$, respectively, are the accumulated branch metrics associated to the candidate survivors ending in "1" and "−1", respectively, and are metrics for the path of a specific candidate survivor because a candidate survivor is all the more probable as the detection signal deviates less from the expected detection signal. According to the Viterbi algorithm, only the more probable of these two candidate survivors is saved. For this purpose, the path metrics associated to the two candidate survivors are compared by the comparator 37 (45). If the output signal of the adder 38 (46) exceeds the output signal of the adder 39 (47), the candidate survivor ending in "1,1" ("−1,−1") is more probable than the candidate survivor ending in "−1,1" ("1,−1"). This means that only a "1" ("−1") needs to be extended to the candidate survivor in shift register 23 (30). As a result of signal x (y), also the switches 41 (65) and 42 (64) are moved to a state c (b), so that the error signal assigned to the candidate survivor ending in "1,1" ("1,−1"), is applied through the sign calculator 40 (44) to the input of the shift register 24 (29), and the absolute value of this difference signal is added to the old path metric of the candidate survivor ending in "1,1" ("−1,−1") so as to obtain a new path metric.

By supplying a clock pulse having period 1/T to the memory elements 21 and 22, the more probable symbol value of the two candidate survivors in the two shift registers 23 and 30 is clocked. In addition, the difference signal associated to each candidate survivor is clocked in the shift registers 24 and 29, respectively.

If the output signal of the adder 38 (46) is smaller than the output signal of the adder 39 (47), the candidate survivor ending in "−1,1" ("1,−1") is more probable than the candidate survivor ending in "1,1" ("−1,−1"). Now the contents of the memory unit 22 (21) are to be copied to memory unit 21 (22), because the candidate survivor having a penultimate data symbol "−1" ("1"), is present in memory unit 22 (21). This copying is effected by feeding an active signal x (y) to the memory unit 21 (22), so that this unit takes over, by the data bus 19, the data stored in the memory unit 22 (21). Once the data have been taken over from the data unit 22 (21), only a "1" ("−1") is to be extended to the candidate survivor in shift register 23 (30). This is simply effected by feeding a clock pulse to the shift register 23 (30). As a result of the signal x (y), also the switches 41 (65) and 42 (64) are moved to a state so that the difference signal belonging to the candidate survivor ending in "−1,1" ("1,−1"), is clocked in the shift register 24 (29) via the sign calculator 40 (44), and the absolute value of this difference signal is added to the old path metric of the candidate survivor ending in "−1,1" ("1,−1") so as to obtain a new path metric.

If both the candidate survivor ending in "−1,1" and the candidate survivor ending in "1,−1" are to be saved, the contents of the memory units 21 and 22 are exchanged before the more recent symbol value with attendant difference signal is extended to the two candidate survivors. This exchange is realized by activating both control signal x and y.

With the aid of the comparator 43, it is determined which of the two candidate survivors is the more probable by comparing the path metrics of these two candidate survivors. On the basis of the output signal z of the comparator 43, the multiplexer 20 is controlled in such a way that the contents of the memory unit containing the more probable candidate survivor are accessible.

For obtaining a proper estimate $h_0$, $h_2$, $h_3$ and $h_4$ ($h_1$ is maintained at 0 by the timing circuit) of the most important samples of the impulse response of the medium, the coefficients $h_0$, $h_2$, $h_3$ and $h_4$ are adapted on the basis of the difference signal. This is effected with the aid of the so-called sign algorithm, this algorithm being a simplified version of the so-called stochastic gradient algorithm.

Both algorithms are described in the journal article entitled "Comparison of the convergence of two algorithms for adaptive FIR digital filters" by T. A. C. M. Claasen and W. F. J. Mecklenbräuker in IEEE Transactions on Circuits and Systems, CAS-28, No. 6, June 1981, pp. 510–518.

In the detection means, according to the invention, the difference signal belonging to the most recent signal sample is not used according to the invention, but rather, a difference signal belonging to an older signal sample and belonging to the recent candidate survivor which is the more probable survivor.

Since the reliability of the decision about the received symbol value for this older signal sample is greater than the reliability of the decision about the symbol value belonging to the most recent signal sample, the value of the difference signal is more reliable. For the coefficients $h_0(k)$, $h_2(k)$, $h_3(k)$ and $h_4(k)$, the following holds:

$$h_0(k) = h_0(k-1) + \alpha sign[\hat{a}(k-3)] \cdot sign[e(k-3)] \quad (5)$$

$$h_2(k) = h_2(k-1) + \alpha sign[\hat{a}(k-5)] \cdot sign[e(k-3)] \quad (6)$$

$$h_3(k) = h_3(k-1) + \alpha sign[\hat{a}(k-5)] \cdot sign[e(k-3)] \quad (7)$$

$$h_4(k) = h_4(k-1) + \alpha sign[\hat{a}(k-7)] \cdot sign[e(k-4)] \quad (8)$$

Figure 5:
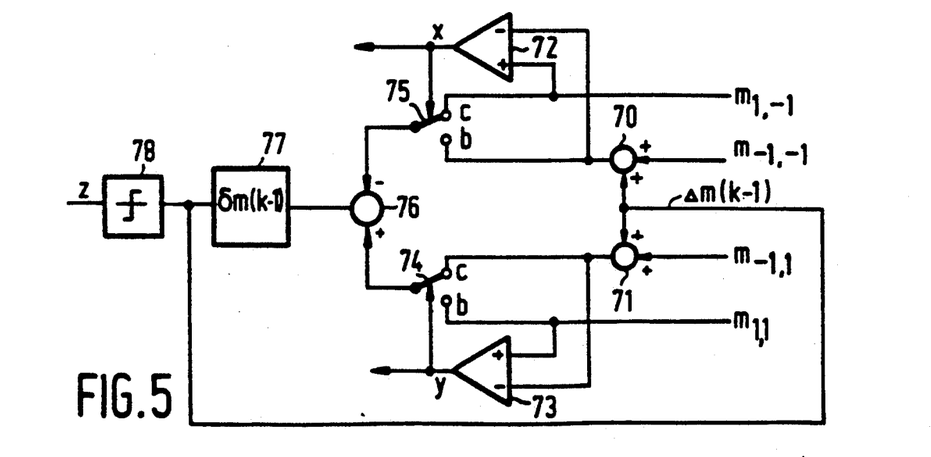
FIG. 5 shows a circuit for updating a path metric difference between two path metrics to be used in a Viterbi detector as shown in FIG. 4.

In the circuit shown in FIG. 5, the signal $m_{1,-1}$ ($m_{1,1}$) is applied to the positive input of a comparator 72 (73) and to a contact c (b) of a change-over switch 75 (74). The signal $m_{-1,-1}$ ($m_{-1,1}$) is applied to an input of an adder 70 (71), while an output of a register 77 carrying output signal $\delta m(k-1)$, is connected to an input of both the adder 70 and the adder 71. The output of the adder 70 (71) is connected to a contact b (c) of the change-over switch 75 (74) and to a negative input of the comparator 72 (73).

The central contact of the change-over switch 74 is connected to a positive input of a subtracter 76, while the central contact of the change-over switch 75 is connected to a negative input of the subtracter 76. The output of the subtracter 76 is connected to the input of the register 77. The output of the register 77 is connected to the input of a sign calculator 78 carrying output signal z.

The output of the comparator 72 carrying output signal x, is connected to the control input of the change-over switch 75, while the output of the comparator 73 is connected to the control input of the change-over switch 74.

The circuit, as shown in FIG. 5, is an alternative to the unit 31 shown in FIG. 4, and is used for updating the path metric going with each survivor. The circuit shown in FIG. 5 updates a path metric difference in lieu of a path metric. If the path metric difference is positive, the candidate survivor ending in "−1" is the more probable, and if the path metric difference is negative, the candidate survivor ending in "1" is the more probable.

Hereinafter, it will be explained how the path metric difference $\delta m$ corresponds to the path metrics $m_1$ and $m_{-1}$. For the path metrics $m_{-1}$ (of the more probable candidate survivor ending in 1) and $m_1$ (of the more probable candidate survivor ending in 1), there may be written:

$$m_{-1}(k) = MIN[m_{-1}(k-1) + m_{-1,-1}(k), \\ m_1(k-1) + m_{1,-1}(k)] \quad (9)$$

$$m_1(k) = MIN[m_1(k-1) + m_{1,1}(k), \\ m_1(k-1) + m_{-1,1}(k)] \quad (10)$$

Herein $m_{-1,-1}$ is the error signal, i.e. the absolute value of the difference signal that occurs if the candidate survivor ends in "−1, −1". $m_{-1,1}$, $m_{1,-1}$ and $m_{1,1}$ are corresponding difference signals belonging to candidate survivors ending in "−1,1", "1,−1" and "1,1", respectively. Since the new path metric is obtained by adding a positive error signal to the old path metric, the path metric will adopt a very large value with time. This may be avoided by updating a path metric difference in lieu of a path metric. For this path metric difference $\delta m(k)$, the following holds:

$$\delta m(k) = m_{-1}(k) - m_1(k) \quad (11)$$

Substitution of (9) and (10) in (11) now produces:

$$\delta m(k) = MIN[m_{-1}(k-1) + m_{-1,-1}(k), m_1(k-1) + \quad (12)$$

-continued
$$m_{1,-1}(k)] - \text{MIN}[m_1(k-1) + m_{1,1}(k), m_{-1}(k-1) + m_{-1,1}(k)]$$

By subtracting a value $m_1(k-1)$ from the two arguments of the MIN functions, one obtains:

$$\delta m(k) = \text{MIN}[m_{-1}(k-1) - m_1(k-1) + m_{-1,-1}(k), \quad (13)$$
$$m_{1,-1}(k)] - \text{MIN}[m_{1,1}(k), m_{-1}(k-1) - m_1(k-1) + m_{-1,1}(k)]$$

Substitution of (11) in (13) finally produces:

$$\delta m(k) = \text{MIN}[\delta m(k-1) + m_{-1,-1}(k), m_{1,-1}(k)] - \quad (14)$$
$$\text{MIN}[m_{1,1}(k), \delta m(k-1) + m_{-1,1}(k)]$$

(14) is a recursive relation between $\delta m(k)$ and $\delta m(k-1)$, this relation being determined with the aid of the circuit shown in FIG. 5.

The adder 70 (71) determines the signal $\delta m(k-1) + m_{1,-1}(\delta m(k-1) + m_{-1,1})$. The comparator 72 (73) compares $\delta m(k-1) + m_{1,-1}(m_{-1,1})$ with $m_{-1,-1}(\delta m(k-1) + m_{-1,1})$. On the basis of the result of this comparison, represented by the signal x (y), the switch 75 (74) is moved to such a state that the smallest signal of the 22 input signals of the two comparators 72 (73) is fed to the negative (positive) input of the subtracter 76. The signal x (y) likewise provides that the correct candidate survivor is stored in memory unit 21 (22) in a fashion used for the storage in the Viterbi detector as shown in FIG. 4. At the output of the adder 76, the signal $\delta m(k)$ is available which is stored in register 77. The control signal z is derived from the contents of register 77 by the sign calculator 78 to control the multiplexer 20.

We claim:

1. Data receiver comprising deriving means for deriving a detection signal from an input signal, an output of the deriving means being coupled to an input of detection means, said detection means determining a most probable sequence of data symbols on the basis of the detection signal, the symbols occurring in the detection signal with a symbol interval T, by recursively updating candidate sequences (survivors) with associated path metrics derived from branch metrics, the branch metrics being an even function of a difference value $e_k$, present at a sampling instant kT of the detection signal, and of the detection signal expected for a respective candidate survivor, where k is an integer, characterized in that the receiver comprises timing means for delaying the sampling instants if the sign of the difference value $e_{k-n}$ at a sampling instant $(k-n)T$, where n is a fixed positive number, and where the difference value is associated to the most probable candidate survivor at the sampling instant kT, and the sign of an estimate $f_{(k-n-m)T}(\hat{a}_{k-n-m})$ of the contribution of a symbol $\hat{a}_{k-n-m}$ (m = 1,2,3, ...), estimated at a sampling instant $(k-n-m)T$, to the detection signal at an instant $(k-n-m)T$ are equal, the symbol $\hat{a}_{k-n-m}$ being taken from the candidate survivor which is the most probable at the sampling instant kT; and for advancing the sampling instants if the two signs are different.

2. Receiver as claimed in claim 1, characterized in that m is equal to 1, in that in the detection means, the input of the detection means is coupled to a first Viterbi detector via first correction means, in that in the detection means, the input of the detection means is coupled to a second Viterbi detector via second correction means, the first correction means subtracting a first correction signal from the input signal of the first correction means and the second correction means subtracting a second correction signal from the input signal of the second correction means, the first and second correction signals being equal to:

$$\sum_{i=1}^{N'} g_i(\hat{a}_{k-2i-1})$$

while for the first correction signal, $\hat{a}_{k-2i-1}$ is taken from the candidate survivor in the first Viterbi detector most probable at an even sampling instant kT, and for the second correction signal, $\hat{a}_{k-2i-1}$ is taken from the candidate survivor in the second Viterbi detector most probable at an odd sampling instant kT, where $g_i(\hat{a}_{k-2i-1})$, at instants $(k+p)T$ with p being an integer greater than or equal to 0, equals $f_i(\hat{a}_{k-2i+1})$; where N is the length in numbers of symbol intervals of the estimate response $f_t$, where N' equals $(N-3)/2$ if N is odd, and where N' equals $(N-2)/2$ if N is even.

3. Receiver as claimed in claim 1, characterized in that the receiver comprises adapting means for adapting $f_t$ to the recent response of the medium to a data symbol on the basis of the branch metrics e and the estimated data symbols â, characterized in that the adapting means adapt $f_t$ at an instant kT on the basis of the branch metric $e_{k-n}$ present at an instant $(k-n)T$, which branch metric is associated to the candidate survivor most probable at the instant kT.

4. Receiver as claimed in claim 2, characterized in that N' is equal to 1, in that the number of possible symbol values is equal to 2 and in that a path metric difference is updated that is a measure for the difference between a first sum of even function values of the consecutive branch metrics associated to a first candidate survivor and a second sum of even function values of the consecutive branch metrics associated to a second candidate survivor.

5. Receiver as claimed in claim 2, characterized in that the receiver comprises adapting means for adapting $f_t$ to the recent response of the medium to a data symbol on the basis of the branch metrics e and the estimated data symbols â, characterized in that the adapting means adapt $f_t$ at an instant kT on the basis of the branch metric $e_{k-n}$ present at an instant $(k-n)T$, which branch metric is associated to the candidate survivor most probable at the instant kT.

6. Receiver as claimed in claim 4, characterized in that the receiver comprises adapting means for adapting $f_t$ to the recent response of the medium to a data symbol on the basis of the branch metrics e and the estimated data symbols â, characterized in that the adapting means adapt $f_t$ at an instant kT on the basis of the branch metric $e_{k-n}$ present at an instant $(k-n)T$, which branch metric is associated to the candidate survivor most probable at the instant kT.

\* \* \* \* \*